US012413005B2

(12) United States Patent
Sakai

(10) Patent No.: US 12,413,005 B2
(45) Date of Patent: Sep. 9, 2025

(54) TERMINAL FITTING AND CONNECTOR

(71) Applicant: SUMITOMO WIRING SYSTEMS, LTD., Mie (JP)

(72) Inventor: Hiroto Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 396 days.

(21) Appl. No.: 18/082,250

(22) Filed: Dec. 15, 2022

(65) Prior Publication Data

US 2023/0208064 A1 Jun. 29, 2023

(30) Foreign Application Priority Data

Dec. 28, 2021 (JP) ................................. 2021-214137

(51) Int. Cl.
*H01R 13/41* (2006.01)
*H01R 12/58* (2011.01)

(52) U.S. Cl.
CPC ............. *H01R 13/41* (2013.01); *H01R 12/58* (2013.01)

(58) Field of Classification Search
CPC ........ H01R 13/41; H01R 12/58; H01R 13/04; H01R 13/40
See application file for complete search history.

(56) References Cited

U.S. PATENT DOCUMENTS 4,632,482 A * 12/1986 Punako ................ H01R 13/187 439/744
5,460,549 A * 10/1995 Muzslay .............. H01R 13/521 439/733.1
6,315,615 B1 * 11/2001 Raistrick .............. H01R 12/585 439/733.1
11,658,426 B2 * 5/2023 Txarola ................ H01R 12/515 439/744
2006/0246786 A1 * 11/2006 Noguchi .............. H01R 12/585 439/751
2007/0270001 A1 * 11/2007 Matsumura ............ H05K 3/284 439/82
2009/0011658 A1 * 1/2009 Shibata .................. H01R 13/41 439/736
2010/0136852 A1 6/2010 Mito
2013/0273753 A1 * 10/2013 Suzuki ................... H05K 1/117 439/59

(Continued)

FOREIGN PATENT DOCUMENTS

JP 2056410 * 5/2009 ............. H01R 13/41

*Primary Examiner* — Truc T Nguyen
(74) *Attorney, Agent, or Firm* — Venjuris, P.C.

(57) ABSTRACT

A terminal fitting 10 is provided with a terminal body portion 11 extending in an axial direction and a plurality of protrusions 20, 30 and 40 projecting in an intersecting direction intersecting the axial direction from the terminal body portion 11. The plurality of protrusions 20, 30 and 40 are arranged side by side in the axial direction and each protrusion has a top surface 21, 31, 41 along the axial direction, a front surface 22, 32, 42 inclined toward a front side in the axial direction from the top surface 21, 31, 41 and a rear surface 23, 33, 43 inclined toward a rear side in the axial direction from the top surface 21, 31, 41. Projection amounts of the plurality of protrusions 20, 30 and 40 in the intersecting direction are larger for the protrusions more on the rear side in the axial direction.

5 Claims, 8 Drawing Sheets

(56) References Cited

U.S. PATENT DOCUMENTS

| | | | | |
|---|---|---|---|---|
| 2014/0045350 | A1* | 2/2014 | Taylor .................... | H01R 13/24 29/846 |
| 2015/0064987 | A1 | 3/2015 | Nakamura | |
| 2016/0014118 | A1 | 1/2016 | Da et al. | |
| 2018/0248291 | A1 | 8/2018 | Kitajima | |

* cited by examiner

TERMINAL FITTING AND CONNECTOR

CROSS-REFERENCE TO RELATED APPLICATIONS

This application is based on and claims priority from Japanese Patent Application No. 2021-214137, filed on Dec. 28, 2021, with the Japan Patent Office, the disclosure of which is incorporated herein in its entirety by reference.

TECHNICAL FIELD

The present disclosure relates to a terminal fitting and a connector.

BACKGROUND

Japanese Patent Laid-open Publication No. 2013-235762 discloses a terminal fitting provided with a terminal body and a press-fitting projection projecting from the terminal body in an orthogonal direction orthogonal to a longitudinal direction of the terminal fitting. The press-fitting projection includes a front protrusion and a rear protrusion. The press-fitting projection is press-fit into a terminal holding hole of a housing. A terminal fitting having a similar configuration is also disclosed in International Publication No. WO 2009/22604 and Japanese Patent Laid-open Publication Nos. 2018-125225 and 2009-016148.

SUMMARY

A terminal fitting as disclosed in International Publication No. WO 2009/22604 and Japanese Patent Laid-open Publication Nos. 2013-235762, 2018-125225, 2009-016148 and 2016-018595 is required to have a configuration capable of further improving a holding force with the terminal fitting inserted in an insertion hole of a housing.

Accordingly, the present disclosure provides a technique capable of improving a holding force for a terminal fitting.

The present disclosure is directed to a terminal fitting with a terminal body portion extending in an axial direction, and a plurality of protrusions projecting in an intersecting direction intersecting the axial direction from the terminal body portion, the plurality of protrusions being arranged side by side in the axial direction, each protrusion having a top surface along the axial direction, a front surface inclined toward a front side in the axial direction from the top surface and a rear surface inclined toward a rear side in the axial direction from the top surface, and projection amounts of the plurality of protrusions in the intersecting direction being larger for the protrusions more on the rear side in the axial direction.

The present disclosure is directed to a connector with the above terminal fitting and a housing provided with an insertion hole, the terminal fitting being arranged in the insertion hole, the protrusions being locked to the insertion hole.

According to the present disclosure, a holding force of a terminal fitting can be improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
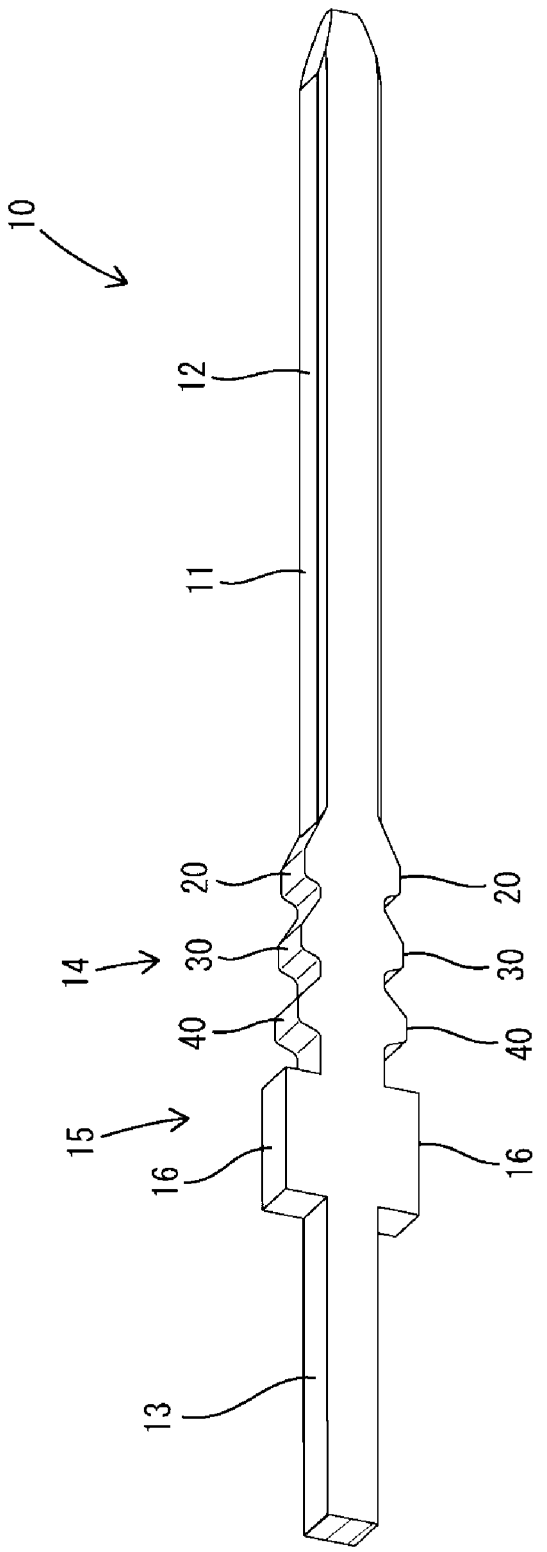
FIG. 1 is a perspective view showing a terminal fitting.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The terminal fitting of the present disclosure is provided with a terminal body portion extending in an axial direction, and a plurality of protrusions projecting in an intersecting direction intersecting the axial direction from the terminal body portion, the plurality of protrusions being arranged side by side in the axial direction, each protrusion having a top surface along the axial direction, a front surface inclined toward a front side in the axial direction from the top surface and a rear surface inclined toward a rear side in the axial direction from the top surface, and projection amounts of the plurality of protrusions in the intersecting direction being larger for the protrusions more on the rear side in the axial direction.

According to the configuration of the present disclosure, the terminal fitting is inserted into an insertion hole of a connector housing from the front side in the axial direction and, when the plurality of protrusions interfere with a wall portion of the insertion hole, the wall portion deformed by being pushed and expanded by the protrusions enters behind the rear surfaces of the protrusions. Besides, since the projection amounts in the intersecting direction are larger for the protrusions more on the rear side in the axial direction, the wall portion deformed by being pushed and expanded by the protrusion on the front side in the axial direction is easily locked by the protrusion on the rear side in the axial direction. Further, since the top surfaces of the protrusions are configured along the axial direction, contact surfaces with the wall portion of the insertion hole are easily secured. Therefore, a force for holding the terminal fitting in the connector housing can be improved.

(2) Preferably, joining portions are provided by rounding a connected part of the top surface and the front surface and a connected part of the top surface and the rear surface.

According to this configuration, the wall portion of the insertion hole is easily deformed by being smoothly pushed and expanded by the protrusion and the deformation of the wall portion of the insertion hole pushed and expanded by the protrusion is easily restored after the passage of the protrusion as compared to a configuration in which the connected part of the top surface and the front surface and the connected part of the top surface and the rear surface are angular.

(3) Preferably, angles of inclination of the front surfaces in the plurality of protrusions are larger for the protrusions more on the rear side in the axial direction.

According to this configuration, since the wall portion of the insertion hole is first pushed and expanded by the front surface of the protrusion having a relatively small angle of inclination, out of the plurality of protrusions, insertion resistance is relatively small and the terminal fitting is easily smoothly inserted. In the protrusion having a relatively large projection amount in the intersecting direction, the wall portion of the insertion hole is pushed and expanded relatively more, but the wall portion of the insertion hole is easily pushed and expanded since the angle of inclination of the front surface is relatively large.

(4) Preferably, a bottom surface along the axial direction is provided behind the rear surface of the protrusion in the terminal body portion.

According to this configuration, in the terminal body portion, the bottom surface capable of securing a length in the axial direction can be arranged on the terminal body portion, and the wall portion of the insertion hole easily enters behind the rear surface of the protrusion.

The connector of the present disclosure is provided with the terminal fitting of any one of (1) to (4) and a housing provided with an insertion hole, the terminal fitting being arranged in the insertion hole, the protrusions being locked to a wall portion of the insertion hole.

According to this configuration, a connector achieving effects similar to those of the above terminal fitting can be realized.

Details of Embodiment of Present Disclosure

Embodiment

A specific embodiment of a terminal fitting of the present disclosure is described below with reference to FIGS. 1 to 8. In this embodiment, an axial direction of a terminal fitting 10 is a front-rear direction. A tip side in the axial direction of the terminal fitting 10 is a front side (side indicated by an arrow F shown in FIGS. 2 and 6), and a side opposite to the tip side is a rear side (side indicated by an arrow R shown in FIGS. 2 and 6).

Configuration of Terminal Fitting

The terminal fitting 10 of this embodiment is a so-called male terminal as shown in FIG. 1. The terminal fitting 10 is formed by stamping an electrically conductive metal plate, for example, made of copper, copper alloy or the like by press-working. Plating may be applied to the surface of the terminal fitting 10.

Figure 2:
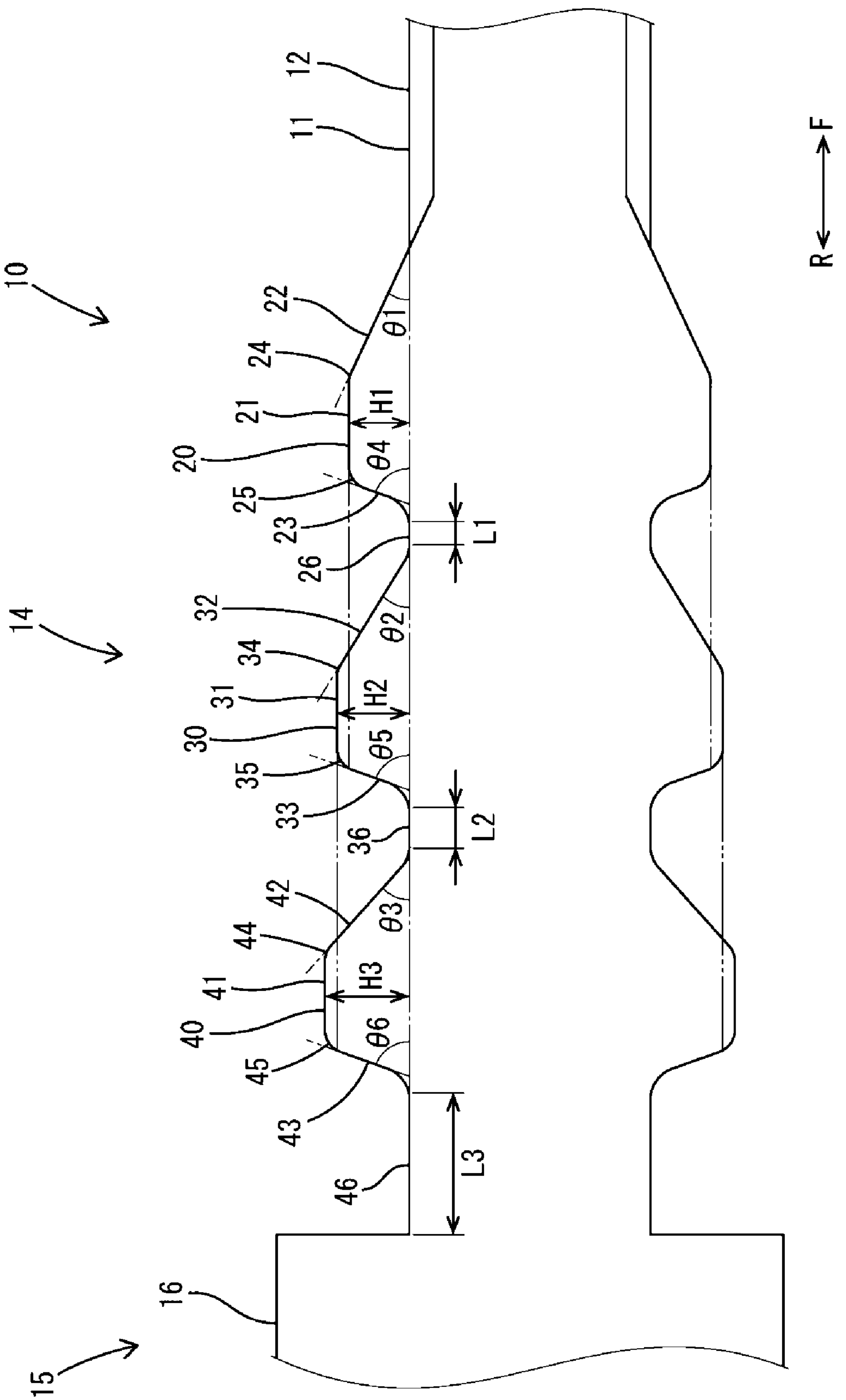
FIG. 2 is a plan view showing the terminal fitting.
Figure 3:
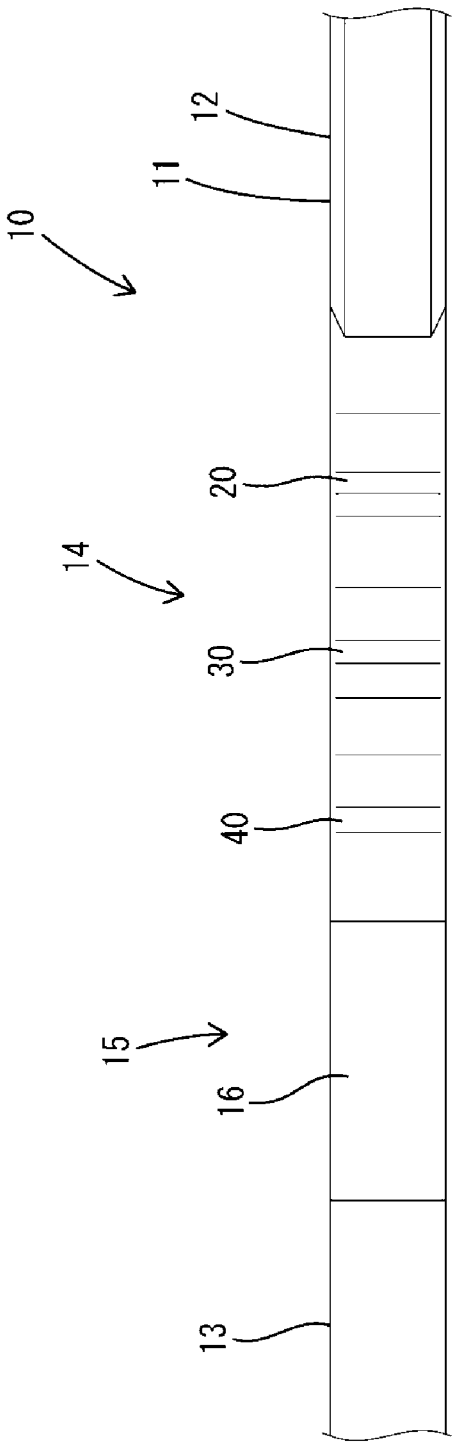
FIG. 3 is a side view showing the terminal fitting.

As shown in FIGS. 1 to 3, the terminal fitting 10 is in the form of a solid rectangular bar elongated in the axial direction (front-rear direction) as a whole. The terminal fitting 10 includes a terminal body portion 11 in the form of a solid rectangular bar extending in the axial direction. The terminal body portion 11 includes a tab 12 in a front part and a board connecting portion 13 in a rear part. The board connecting portion 13 is inserted into a connection hole (not shown) of a printed circuit board and electrically connected to an electrically conductive portion of the printed circuit board. Note that the board connecting portion 13 is bendable if necessary.

Figure 6:
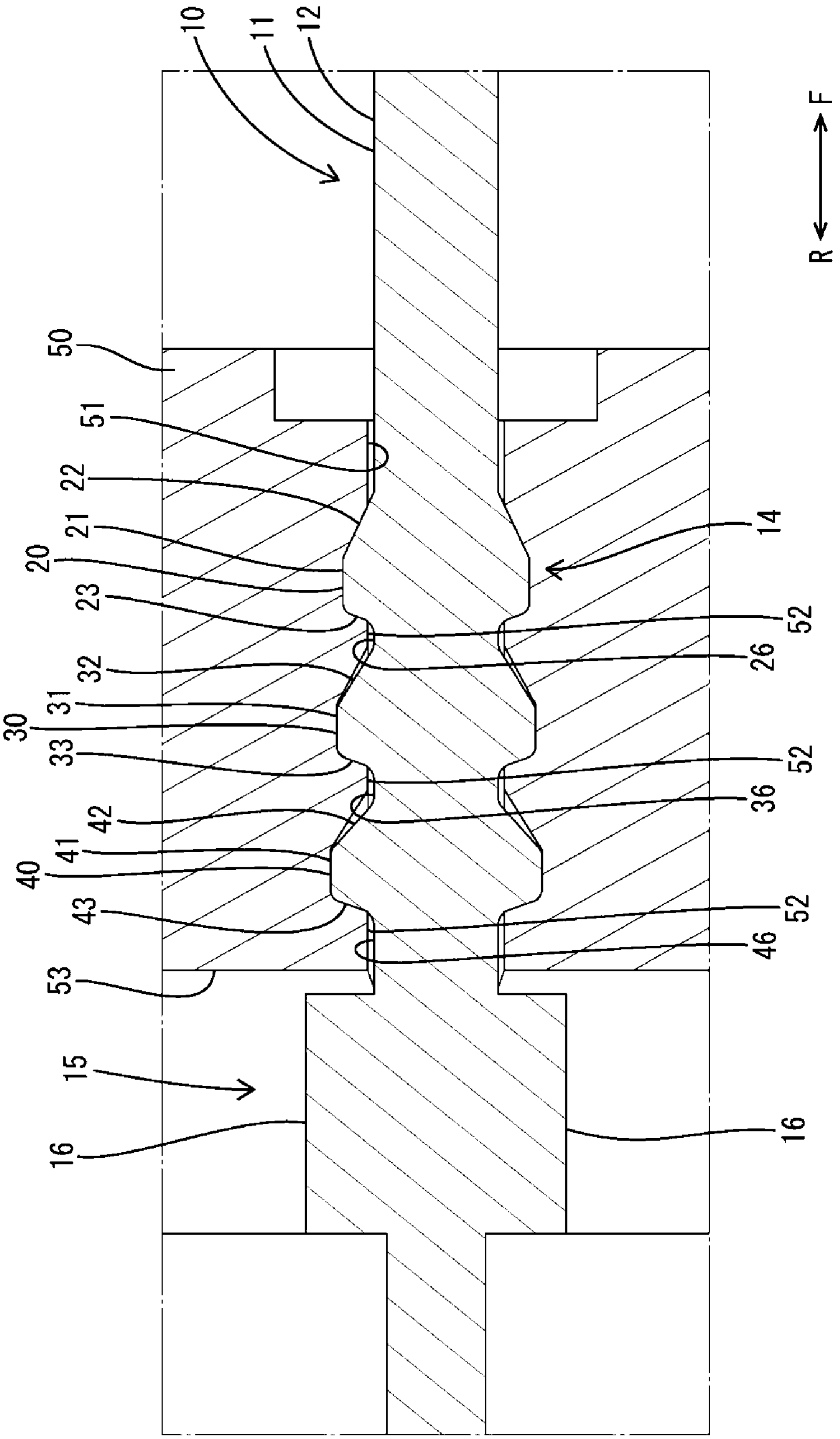
FIG. 6 is a section of the insertion hole and the periphery thereof in a state where the terminal fitting is inserted in the insertion hole of the housing.
Figure 7:
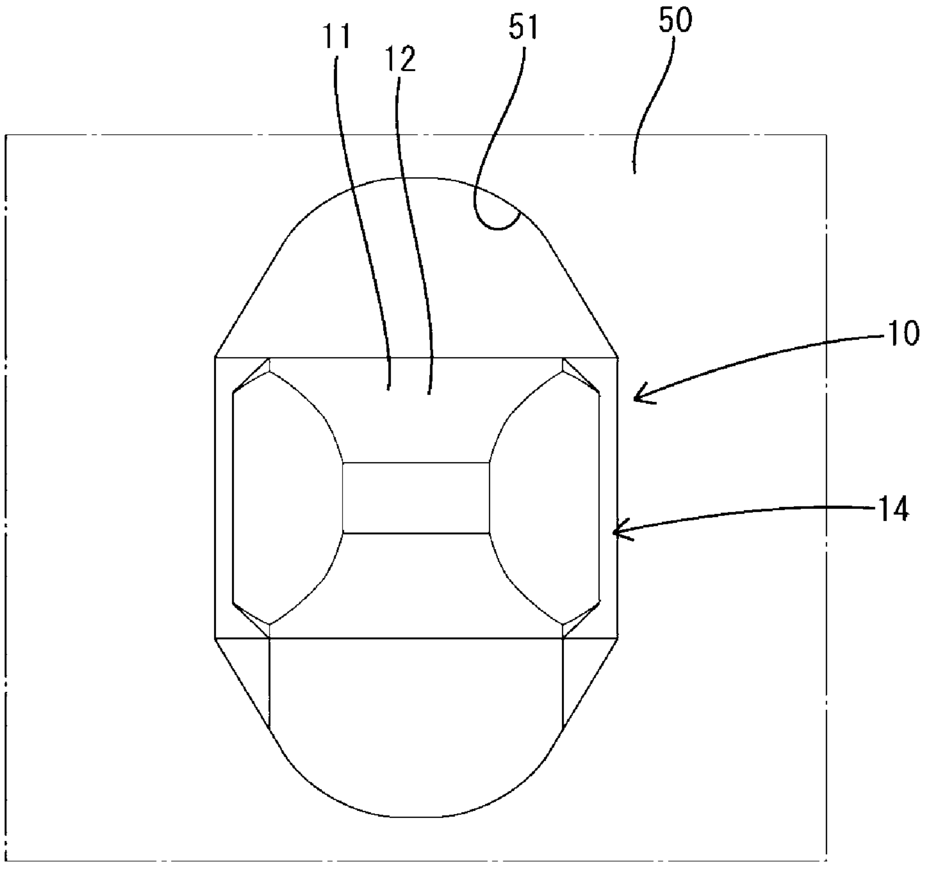
FIG. 7 is an enlarged view of the terminal fitting viewed from the tip side showing the state where the terminal fitting is inserted in the insertion hole of the housing.

In the terminal body portion 11, a press-fitting portion 14 and a stopper portion 15 are provided between the tab 12 and the board connecting portion 13. The press-fitting portion 14 is press-fit into an insertion hole 51 provided in a housing 50 (see FIGS. 5 to 7). The housing 50 is, for example, made of resin. The press-fitting portion 14 includes a plurality of protrusions 20, 30 and 40. The protrusions 20, 30 and 40 project in an intersecting direction intersecting the axial direction (front-rear direction) from the terminal body portion 11. The protrusions 20, 30 and 40 are provided on each of both sides in the intersecting direction of the terminal body portion 11. The respective protrusions 20, 30 and 40 are arranged side by side in the axial direction like saw teeth. As shown in FIG. 6, if the press-fitting portion 14 is press-fit into the insertion hole 51, the respective protrusions 20, 30 and 40 are locked by biting into a wall portion 52 of the insertion hole 51 and the terminal fitting 10 is retained and held in the housing 50. The board connecting portion 13 is exposed outside the housing 50.

As shown in FIG. 1, the stopper portion 15 is located behind the press-fitting portion 14 and provided with a pair of protruding portions 16. As shown in FIG. 6, by inserting the press-fitting portion 14 into the insertion hole 51 from behind and stopping the pair of protruding portions 16 in contact with a rear surface 53 of the housing 50, a mounted position of the terminal fitting 10 in the housing 50 is specified. With the terminal fitting 10 mounted in the housing 50, the tab 12 is arranged to project into a receptacle (not shown) of the housing 50.

Both upper and lower surfaces of the terminal body portion 11, the press-fitting portion 14 and the stopper portion 15 shown in FIG. 3 are flat along the axial direction and arranged in parallel to each other.

Figure 4:
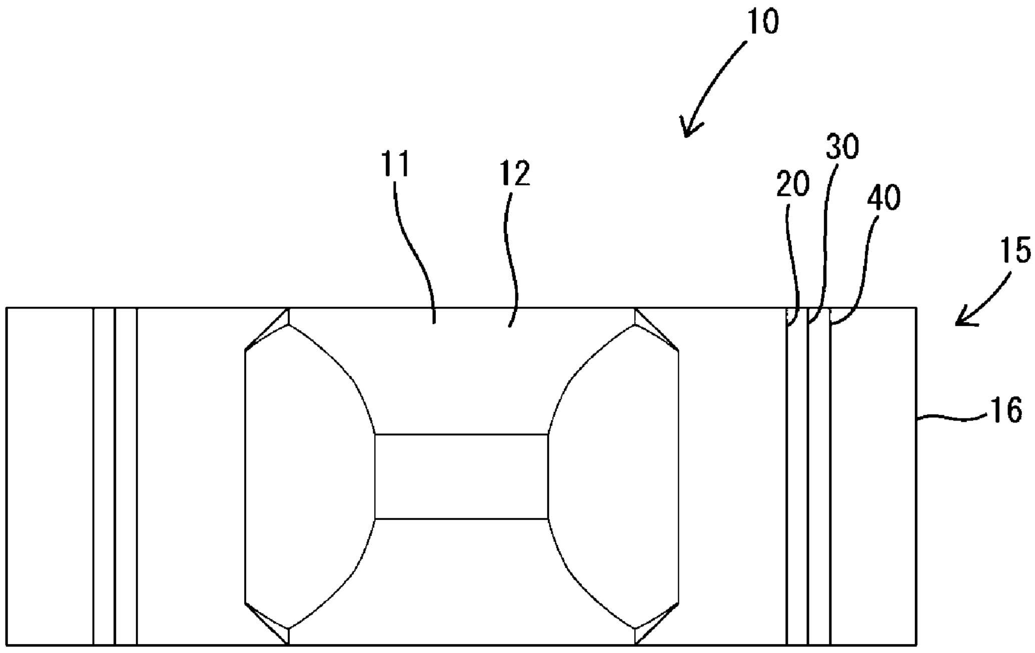
FIG. 4 is an enlarged view of the terminal fitting viewed from a tip side.
Figure 5:
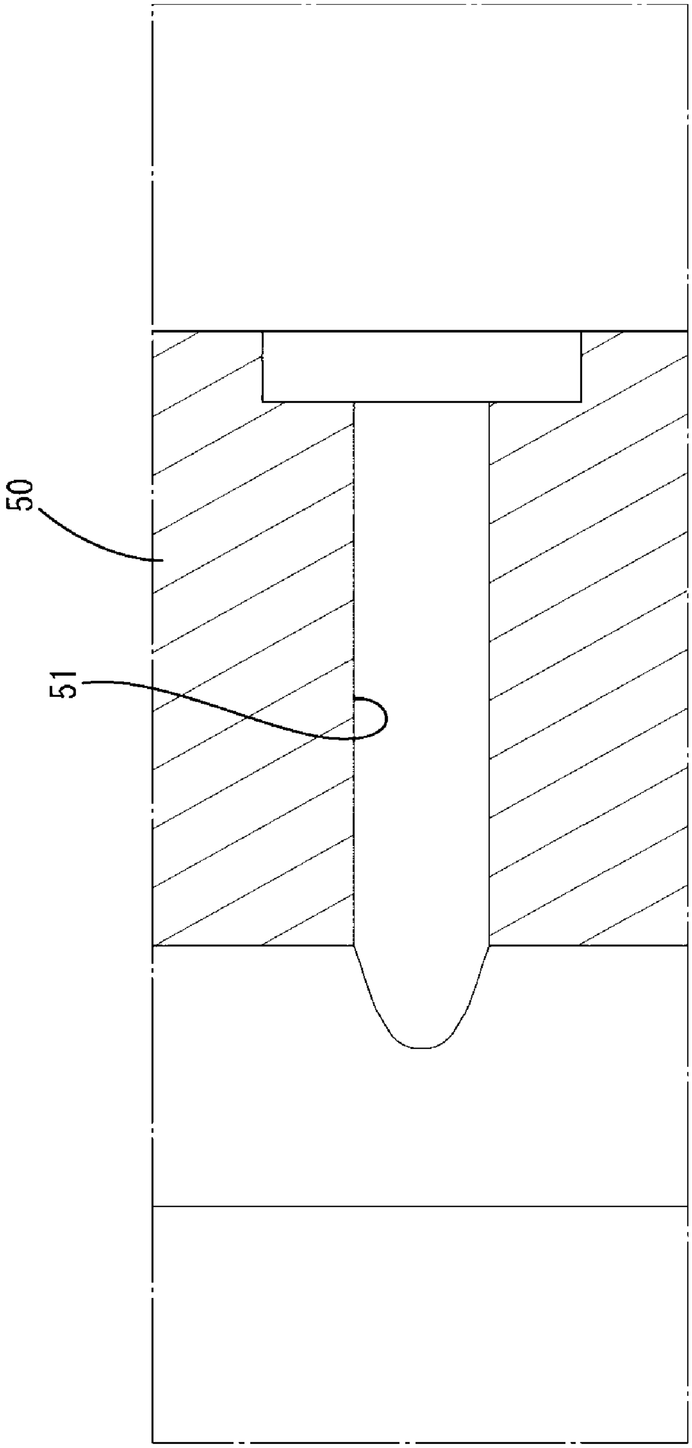
FIG. 5 is a section of an insertion hole and the periphery thereof before the insertion of the terminal fitting in a housing.

Side surfaces (surfaces along a vertical direction shown in FIG. 4) of the tab 12 are both formed in parallel to the vertical direction shown in FIG. 4. Four corner parts of the tab 12 are chamfered. The tip (front end) of the tab 21 is formed in a tapered manner to reduce dimensions. The terminal fitting 10 can be easily press-fit into the insertion hole 51 of the housing 50 by the tapered tip.

Configuration of Press-Fitting Portion

The plurality of protrusions 20, 30 and 40 are also called first protrusions 20, second protrusions 30 and third protrusions 40 in an order of arrangement from the tip side (front side) to the opposite side (rear side) in the axial direction (front-rear direction). Adjacent ones of the first, second and third protrusions 20, 30 and 40 are arranged apart from each other. Note that the first, second and third protrusions 20, 30 and 40 on one side (upper side of FIG. 2) in the intersecting direction of the press-fitting portion 14 are described below, but the first, second and third protrusions 20, 30 and 40 on the other side (lower side of FIG. 2) in the intersecting direction are also similarly configured.

As shown in FIG. 2, the first protrusion 20 is provided with a top surface 21, a front surface 22 and a rear surface 23. The top surface 21 is along the axial direction. More specifically, the top surface 21 is a flat surface orthogonal to the intersecting direction. The front surface 22 is inclined toward a front side in the axial direction from the top surface 21. That is, the front surface 22 is inclined downward toward the front side in the axial direction. The rear surface 23 is inclined toward a rear side in the axial direction from the top surface 21. That is, the rear surface 23 is inclined downward toward the rear side in the axial direction.

As shown in FIG. 2, the second protrusion 30 is also provided with a top surface 31, a front surface 32 and a rear surface 33 configured similarly to the top surface 21, the front surface 22 and the rear surface 23 of the first protrusion 20. The third protrusion 40 is also provided with a top surface 41, a front surface 42 and a rear surface 43 configured similarly to the top surface 21, the front surface 22 and the rear surface 23 of the first protrusion 20.

As shown in FIG. 6, when the terminal fitting 10 is inserted into the insertion hole 51 of the housing 50 from the front side in the axial direction, the plurality of protrusions 20, 30 and 40 interfere with the wall portion 52 of the insertion hole 51. Here, an inserting direction of the terminal fitting 10 into the insertion hole 51 is a direction along the axial direction. The wall portion 52 deformed by being pushed and expanded by the protrusions 20, 30 and 40 enters clearances between adjacent ones of the protrusions (more specifically, behind the rear surfaces 23, 33 and 43 of the respective protrusions 20, 30 and 40). The wall portion 53 having entered behind the rear surfaces 23 of the first protrusions 20 is locked by the front surfaces 32 of the second protrusions 30. The wall portion 53 having entered behind the rear surfaces 33 of the second protrusions 30 is locked by the front surfaces 42 of the third protrusions 40.

Since the respective top surfaces 21, 31 and 41 extend along the axial direction, contact surfaces with the wall portion 52 of the insertion hole 51 are easily secured. Further, since the tips of the respective protrusions 20, 30 and 40 are not pointed, a load to the wall portion 52 of the insertion hole 51 can be dispersed and the breakage and scraping of the wall portion 52 during insertion and during holding can be suppressed. Since the respective front surfaces 22, 32 and 42 are inclined toward the front side in the axial direction, the wall portion 52 of the insertion hole 51 can be smoothly pushed and expanded while being hardly scratched. Since the rear surface 23 is inclined toward the rear side in the axial direction, the part of the wall portion 52 of the insertion hole 51 entering behind the rear surface 23 is easily pressed against the front surface 32 of the second protrusion 30 located behind. Since the rear surface 33 is inclined toward the rear side in the axial direction, the part of the wall portion 52 of the insertion hole 51 entering behind the rear surface 33 is easily pressed against the front surface 42 of the third protrusion 40 located behind. Therefore, a force for holding the terminal fitting 10 in the housing 50 can be improved.

As shown in FIG. 2, projection amounts of the plurality of protrusions 20, 30 and 40 in the intersecting direction are larger for the protrusions located more on the rear side in the axial direction. Specifically, if H1 denotes a projection amount of the first protrusion 20 in an orthogonal direction orthogonal to the axial direction, H2 denotes a projection amount of the second protrusion 30 in the orthogonal direction and H3 denotes a projection amount of the third protrusion 40 in the orthogonal direction, there is a relationship of $H1<H2<H3$. Since the projection amounts in the intersecting direction are larger for the protrusions more on the rear side in the axial direction as just described, a locking margin of the wall portion 52 of the insertion hole 51 deformed by being pushed and expanded by the protrusion on the front side in the axial direction and the protrusion located on the rear side in the axial direction is easily secured. Therefore, the force for holding the terminal fitting 10 in the housing 50 can be improved.

As shown in FIG. 2, a joining portion 24 is provided by rounding a connected part of the top surface 21 and the front surface 22 in the first protrusion 20. The joining portion 24 is convexly curved outward in the intersecting direction (side opposite to the terminal body portion 11). As compared to a configuration in which the connected part of the top surface 21 and the front surface 22 is angular, the wall portion 52 of the insertion hole 51 is easily deformed by being smoothly pushed and expanded by the first protrusion 20. A joining portion 25 is provided by rounding a connected part of the top surface 21 and the rear surface 23 in the first protrusion 20. The joining portion 24 is convexly curved outward in the intersecting direction (side opposite to the terminal body portion 11). As compared to a configuration in which the connected part of the top surface 21 and the rear surface 23 is angular, the deformation of the wall portion 52 of the insertion hole 51 pushed and expanded by the first protrusion 20 is easily restored after the passage of the first protrusion 20.

As shown in FIG. 2, joining portions 34, 35 configured similarly to the projections 24, 25 of the first protrusion 20 are provided also on the second protrusion 30. Jointing portions 44, 45 configured similarly to the projections 24, 25 of the first protrusion 20 are provided also on the third protrusion 40.

As shown in FIG. 2, angles of inclination (angles of inclination with respect to the axial direction) of the front surfaces of the plurality of protrusions 20, 30 and 40 are larger for the protrusions more on the rear side in the axial direction. Specifically, if $\theta 1$ denotes the angle of inclination of the front surface 22 of the first protrusion 20, $\theta 2$ denotes the angle of inclination of the front surface 32 of the second protrusion 30 and $\theta 3$ denotes the angle of inclination of the front surface 42 of the third protrusion 40, there is a relationship of $\theta 1<\theta 2<\theta 3$. Since the wall portion 52 of the insertion hole 51 is first pushed and expanded by the front surfaces 22 of the first protrusion 20 having a relatively small angle of inclination, out of the plurality of protrusions 20, 30 and 40, insertion resistance is relatively small and the terminal fitting 10 is easily smoothly inserted. The wall portion 52 of the insertion hole 51 is pushed and expanded relatively more by the protrusions 30, 40 having a relatively large projection amount in the intersecting direction, but the wall portion 52 of the insertion hole 51 is easily pushed and expanded since the angles of inclination of the front surfaces 32, 42 are relatively large.

As shown in FIG. 2, angles of inclination (angles of inclination with respect to the axial direction) of the rear surfaces of the plurality of protrusions 20, 30 and 40 are larger for the protrusions more on the rear side in the axial direction. Specifically, if $\theta 4$ denotes the angle of inclination of the rear surface 23 of the first protrusion 20, $\theta 5$ denotes the angle of inclination of the rear surface 33 of the second protrusion 30 and $\theta 6$ denotes the angle of inclination of the rear surface 43 of the third protrusion 40, there is a relationship of $\theta 4<\theta 5<\theta 6$.

As shown in FIG. 2, a bottom surface 26 is provided behind the rear surface 23 of the first protrusion 20 in the terminal body portion 11. The bottom surface 26 extends along the axial direction. More specifically, the bottom surface 26 is a flat surface orthogonal to the intersecting direction. The bottom surface 26 capable of ensuring a length in the axial direction can be arranged behind the rear surface 23 of the first protrusion 20, and the wall portion 52 of the insertion hole 51 more easily enters behind the rear surface 23. In the terminal body portion 11, a bottom surface 36 configured similarly to the bottom surface 26 is provided also behind the rear surface 33 of the second protrusion 30. In the terminal body portion 11, a bottom surface 46 configured similarly to the bottom surface 26 is provided also behind the rear surface 43 of the third protrusion 40.

As shown in FIG. 2, the lengths along the axial direction are larger for the bottom surfaces located more on the rear side in the axial direction. Specifically, if L1 denotes the length along the axial direction of the bottom surface 26, L2 denotes the length along the axial direction of the bottom surface 36 and L3 denotes the length along the axial direction of the bottom surface 46, there is a relationship of L1<L2<L3. In this way, the deformed wall portion 52 of the insertion hole 51 more easily approaches the bottom surfaces more on the rear side.

As shown in FIG. 2, a connected part of the rear surface 23 of the first protrusion 20 and the bottom surface 26 is in the form of a curved surface. Similarly, a connected part of the rear surface 33 of the second protrusion 30 and the bottom surface 36 is in the form of a curved surface. Similarly, a connected part of the rear surface 43 of the third protrusion 40 and the bottom surface 46 is in the form of a curved surface.

As shown in FIG. 2, a connected part of the bottom surface 26 and the front surface 32 of the second protrusion 30 is in the form of a curved surface. Similarly, a connected part of the bottom surface 36 and the front surface 42 of the third protrusion 40 is in the form of a curved surface.

Configuration of Connector

Figure 8:
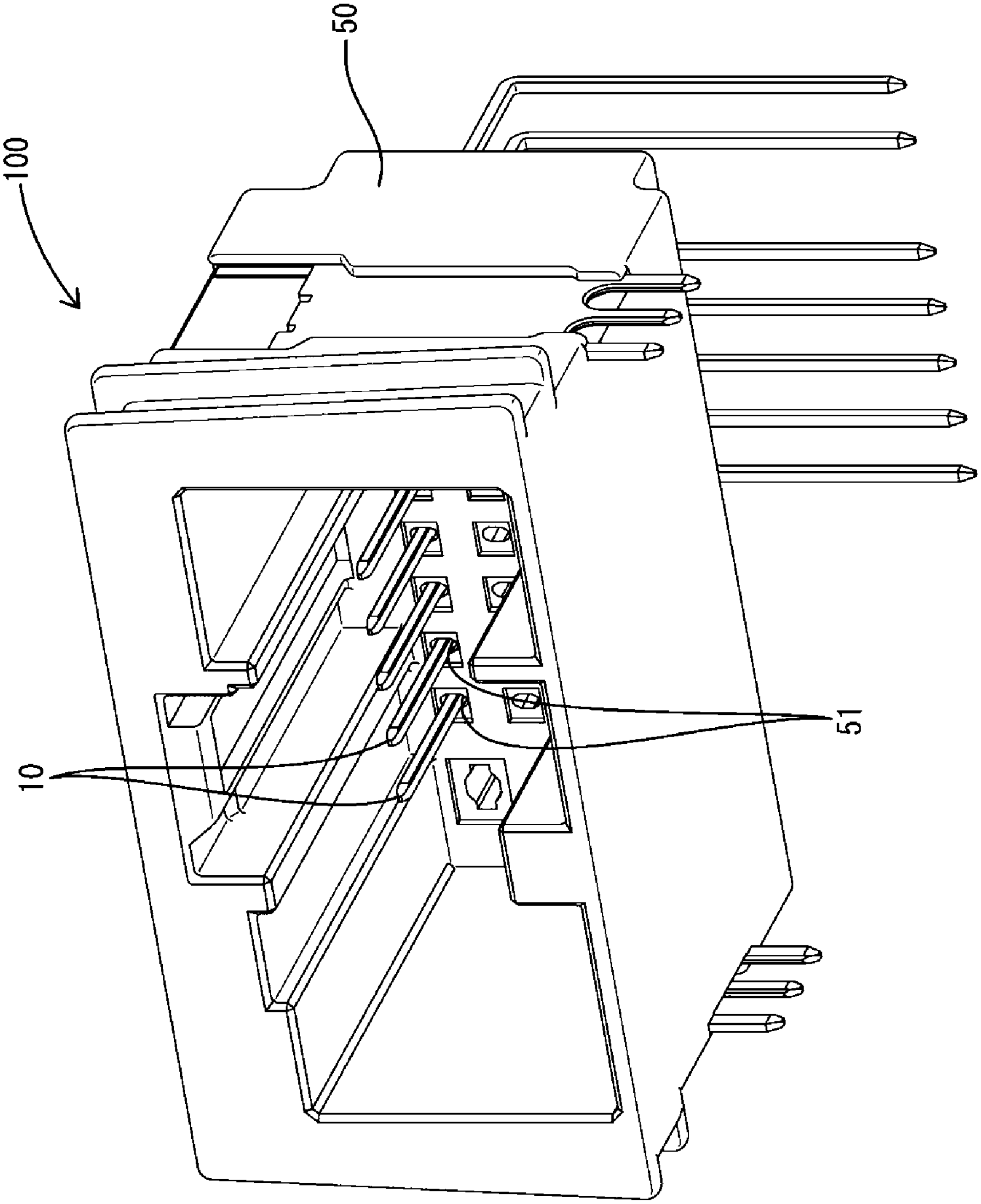
FIG. 8 is a perspective view showing a connector.

A connector 100 of this embodiment is provided with the terminal fittings 10 and the housing 50 as shown in FIG. 8. The housing 50 is provided with the insertion holes 51 in which the terminal fittings 10 are arranged. As shown in FIG. 6, the protrusions 20, 30 and 40 are locked to the wall portion 52 of the insertion hole 51.

Effects of Embodiment

In the terminal fitting 10 of this embodiment, the plurality of protrusions are arranged side by side in the axial direction and each has the top surface along the axial direction, the front surface inclined toward the front side in axial direction from the top surface and the rear surface inclined toward the rear side in the axial direction from the top surface, and the projection amounts in the intersecting direction of the plurality of protrusions are larger for the protrusions more on the rear side in the axial direction.

According to the configuration of the present disclosure, the terminal fitting 10 is inserted into the insertion hole 51 of the housing 50 from the front side in the axial direction and, when the plurality of protrusions 20, 30 and 40 interfere with the wall portion 52 of the insertion hole 51, the wall portion 52 deformed by being pushed and expanded by the protrusions 20, 30 and 40 enters behind the rear surfaces 23, 33 and 43 of the protrusions 20, 30 and 40. Besides, since the projection amounts in the intersecting direction are larger for the protrusions more on the rear side in the axial direction, the wall portion 52 deformed by being pushed and expanded by the protrusion on the front side in the axial direction is easily locked by the protrusion on the rear side in the axial direction. Further, since the top surfaces 21, 31 and 41 of the protrusions 20, 30 and 40 are configured along the axial direction, contact surfaces with the wall portion 52 of the insertion hole 51 are easily secured. Therefore, a force for holding the terminal fitting 10 in the housing 50 can be improved.

Further, in the first protrusion 20, the joining portions 24, 25 are provided by rounding the connected part of the top surface 21 and the front surface 22 and the connected part of the top surface 21 and the rear surface 23. The wall portion 52 of the insertion hole 51 is easily deformed by being smoothly pushed and expanded by the first protrusion 20 as compared to a configuration in which the connected part of the top surface 21 and the front surface 22 is angular. The deformation of the wall portion 52 of the insertion hole 51 pushed and expanded by the first protrusion 20 is easily restored after the passage of the first protrusion 20 as compared to a configuration in which the connected part of the top surface 21 and the rear surface 23 is angular. Similar effects are achieved also for the second and third protrusions 30, 40.

Further, the angles of inclination of the front surfaces in the plurality of protrusions 20, 30 and 40 are larger for the protrusions more on the rear side in the axial direction. Thus, the wall portion 52 of the insertion hole 51 is first pushed and expanded by the front surfaces 22 of the first protrusions 20 having a relatively small angle of inclination, out of the plurality of protrusions 20, 30 and 40, wherefore insertion resistance is relatively small and the terminal fitting 10 is easily smoothly inserted. In the second and third protrusions 30, 40 having a relatively large projection amount in the intersecting direction, the wall portion 52 of the insertion hole 51 is pushed and expanded relatively more, but the wall portion 52 of the insertion hole 51 is easily pushed and expanded since the angles of inclination of the front surfaces 32, 42 are relatively large.

Further, the bottom surfaces 26, 36 and 46 along the axial direction are provided behind the rear surfaces 23, 33 and 43 of the protrusions 20, 30 and 40 in the terminal body portion 11. According to this configuration, the bottom surfaces 26, 36 and 46 capable of ensuring lengths in the axial direction can be arranged in the terminal body portion 11 and the wall portion 52 of the insertion hole 51 more easily enters behind the rear surfaces 23, 33 and 43 of the protrusions 20, 30 and 40.

Other Embodiments

The present invention is not limited to the above described and illustrated embodiment and is represented by claims. The present invention is intended to include all changes in the scope of claims and in the meaning and scope of equivalents and also include the following embodiment.

Although the terminal fitting 10 includes three protrusions 20, 30 and 40 in the above embodiment, two, four or more protrusions may be provided.

Although the terminal body portion 11 is in the form of a rectangular bar in the above embodiment, the terminal body portion 11 may have another shape such as a cylindrical shape.

In the above embodiment, the projection amount of the protrusion in the intersecting direction may be equal between the first and second protrusions 20, 30 or may be equal between the second and third protrusions 30, 40.

In the above embodiment, the angle of inclination of the front surface of the protrusion may be equal between the first and second protrusions 20, 30 or may be equal between the second and third protrusions 30, 40.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A terminal fitting, comprising:

a terminal body portion extending in an axial direction; and a plurality of protrusions projecting in an intersecting direction intersecting the axial direction from the terminal body portion, the plurality of protrusions being arranged side by side in the axial direction, each protrusion having a top surface along the axial direction, a front surface inclined frontward in the axial direction from the top surface and a rear surface inclined rearward in the axial direction from the top surface, wherein projection amounts of the plurality of protrusions in the intersecting direction increase as the protrusions are positioned further rearward along the axial direction, the terminal body portion includes bottom surfaces along the axial direction, each positioned between the rear surface of one of the plurality of protrusions and the front surface of another of the plurality of protrusions, and lengths of the bottom surfaces in the axial direction increase as the bottom surfaces are positioned further rearward along the axial direction.

2. The terminal fitting of claim 1, wherein joining portions are provided by rounding a connected part of the top surface and the front surface and a connected part of the top surface and the rear surface.

3. The terminal fitting of claim 1, wherein angles of inclination of the front surfaces in the plurality of protrusions increase as the protrusions are positioned further rearward along the axial direction.

4. A connector, comprising:

the terminal fitting of claim 1; and a housing provided with an insertion hole, the terminal fitting being arranged in the insertion hole, the protrusions being locked to a wall portion of the insertion hole.

5. The connector of claim 4, wherein the terminal fitting further includes a stopper provided on the terminal body portion between the plurality of protrusions and a board connecting portion on a rear side of the terminal body portion, and the stopper is configured to contact an outer rear surface of the housing to stop insertion of the terminal body portion into the insertion hole.

* * * * *